B. F. Sturtevant,
Fan Blower.
No. 102,062.      Patented Apr. 19, 1870.
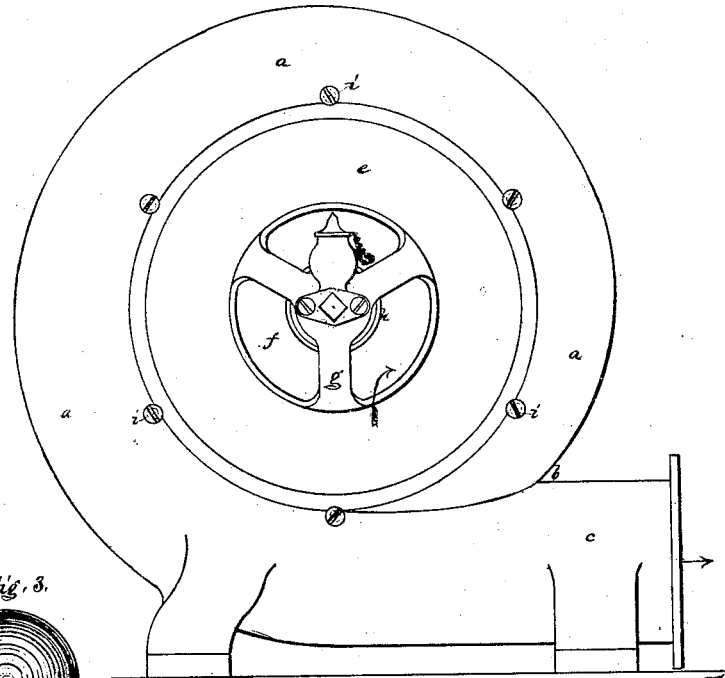
Fig. 1.
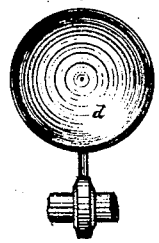
Fig. 3.
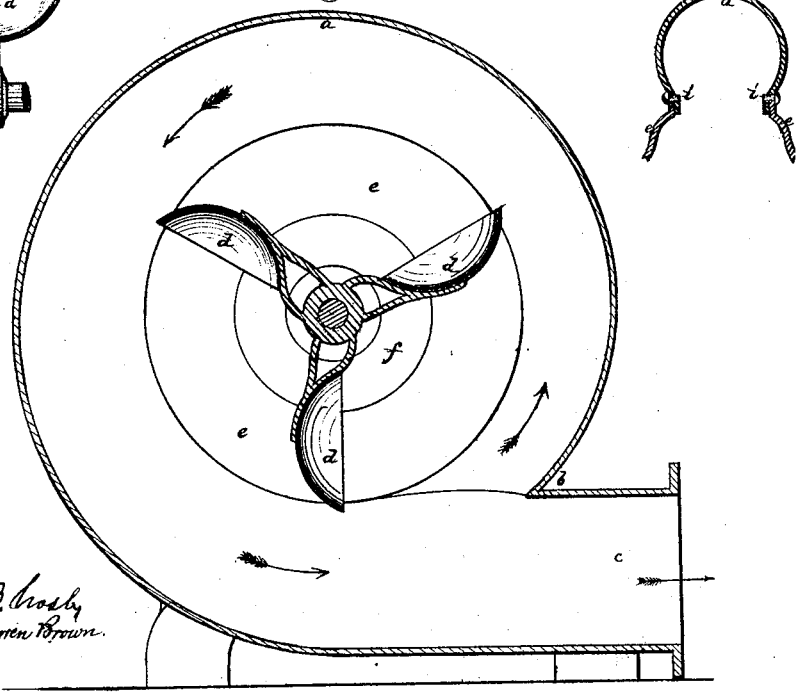
Fig. 2.
Fig. 4.
Witnesses: J. B. Crosby, C. Warren Brown
B. F. Sturtevant

United States Patent Office.

BENJAMIN F. STURTEVANT, OF WEST ROXBURY, MASSACHUSETTS.

Letters Patent No. 102,062, dated April 19, 1870.

IMPROVEMENT IN BLOWERS.

The Schedule referred to in these Letters Patent and making part of the same.

*To all whom it may concern:*

Be it known that I, B. F. STURTEVANT, of West Roxbury, in the county of Norfolk and State of Massachusetts, have invented Improvements in Blowers; and I do hereby declare that the following, taken in connection with the drawings which accompany and form part of this specification, is a description of my invention sufficient to enable those skilled in the art to practice it.

This invention relates to certain new and useful improvements in the details of construction of centrifugal blowers, one of which, embodying my invention, is shown in side elevation in figure 1, and in vertical longitudinal section in figure 2 of the drawings.

Figure 3 shows one of the blades or fans in elevation; and

Figure 4 shows in section a portion of the blower-case, and a portion of one of the side plates, illustrating how the latter is connected to the former so as to be capable of any amount of angular adjustment.

One part of my invention consists in giving to the blades or fans of the blower-wheel a cupped or dishing form, and arranging them so that their concave faces will be the surfaces which operate upon the air to impel it.

Another part of my invention consists in forming, integral with either of the side plates of the blower-case, a bearing for a journal of the fan-wheel shaft, said bearing being connected with the side plate by radial arms which span the air-inlet opening in the plate.

And another part of my invention consists in the arrangement of either side plate in such a manner, that it may be adjusted either to a very slight or a very great angular distance, so as to let a belt from any direction enter upon a pulley freely between the arms which support the shaft journal.

The main part of the blower-case, marked $a$, is shown as made in one casting, though it may be made in pieces if desirable, especially when the blower is of large size, and the air-passage around the fan-wheel is shown as increasing in capacity from the location denoted by $b$ to the outlet or delivery mouth $c$. Each fan or blade, $d$, is formed out of thin sheet metal into a cupped shape, which is preferably a portion of a hollow sphere or spheroid, said fans or blades, to any desired number, being fixed upon the arms of a suitable spider on the blower-shaft, with their concave faces opposed to the air to be moved, the direction of the current being indicated by the arrows seen in figure 2.

The extremities of these cupped blades, as fixed on the spider, project preferably but slightly into the scroll or spiral-shaped air-passage, and the side plates $e$ are so formed as to very nearly coincide with the path described by the sides of the blades $d$, in their rotation.

The inner edges of the side plates $e$ are made to fit the seats formed to receive them in the body of the blower-case $a$, as seen in figure 4 in detail, and are clamped to the case by any suitable fastenings. I prefer to make use of screws $i$, with large heads, for such fastenings, the screws being tapped into the case so that one side of the screw-heads will extend over the peripheries of the side plates, so that, when all of the screws on one side are loosened, the plate on that side may be turned or set angularly any distance or amount required, and may also be held fast in any desired position, by merely tightening the screws so that their heads will pinch upon the adjacent side plate.

If these screws extended through the side plates into the case, then the adjustment would always be the distance apart of two or more screws, and the spacing of the screws would have to be very accurately made. The air-inlet opening made in each side plate, and seen at $f$, is spanned by arms $g$, which are made integral with the side plates and with the bearing for the fan-wheel shaft, so that the blower is made very simple in its construction and of but few parts, and the arms can be turned with the heads, to receive, between the arms upon the driving pullies $h$, belts from any direction, and when the arms are properly set with reference to the driving belts, the plates are easily and quickly secured in position.

I claim, in combination with a centrifugal blower, cupped fan-blades arranged as described.

Also, a centrifugal blower, in which a side plate has the air-inlet therein spanned by arms which support a bearing of the fan-shaft, when said arms are part of the plate and can only be moved by movement of the plate, substantially as described.

Also, a centrifugal blower, in which a side plate, having supporting arms for the fan-shaft, is clamped to the blower-case, so as to admit of any degree of angular adjustment of the plate and arms, substantially as described.

B. F. STURTEVANT.

Witnesses:
  J. B. CROSBY,
  J. J. HALSTED.